United States Patent [19] [11] 4,088,897
Soot [45] May 9, 1978

[54] NUCLEAR FUEL STORAGE RACK

[76] Inventor: Olaf Soot, 9 Tomahawk Lane, Greenwich, Conn. 06830

[21] Appl. No.: 760,687

[22] Filed: Jan. 19, 1977

Related U.S. Application Data

[63] Continuation-in-part of Ser. No. 654,475, Feb. 2, 1976, Pat. No. 4,034,227.

[51] Int. Cl.² ............................................. G21F 5/00
[52] U.S. Cl. .................................................. 250/507
[58] Field of Search ............... 250/506, 507, 515, 518; 176/30, 87

[56] References Cited

U.S. PATENT DOCUMENTS

| 3,129,836 | 4/1964 | Frevel | 176/87 UX |
| 3,859,533 | 1/1975 | Suvanto | 250/507 |

Primary Examiner—Davis L. Willis

[57] ABSTRACT

Nuclear fuel storage rack comprising a rigid honeycomb formed of checkerboard-arrayed, corner-joined elongated tubular enclosures. Each enclosure comprises a structural wall section containing embedded poison material. Additional poison filled tubes may be located in the spaces formed between the connected enclosures.

21 Claims, 11 Drawing Figures

NUCLEAR FUEL STORAGE RACK

This application is a continuation-in-part of my prior copending application, Ser. No. 654,475, filed Feb. 2, 1976, now U.S. Pat. No. 4,034,227.

This invention relates to a nuclear fuel storage rack and systems comprising such racks, and is an improvement over the rack described in my copending application, Ser. No. 654,475, now U.S. Pat. No. 4,034,227.

My copending application, Ser. No. 654,475, whose contents are hereby incorporated by reference, describes a novel rack construction providing increased fuel packing density, which is strong and will readily withstand seismic loads, and by virtue of its modular construction can be built and installed in existing storage pools at reasonably low cost. These benefits are achieved by a construction featuring plural elongated tubular wall enclosures rigidly joined at their corners in a checkerboard array to form a rigid honeycomb structure where the walls of individual tubular enclosures through their corner connections form rigid shear walls defining a total number of fuel-receiving slots equal to approximately twice the number of enclosures provided. The tubular enclosure wall construction provides elongated grooves for receiving poison pins or rods as neutron absorbers to reduce activity of neighboring spent fuel, and the rack is also provided with a strengthening top stiffener frame.

The present invention is directed to a similar construction employing an improved tubular enclosure wall construction and poison barriers which not only provides the same benefits as my prior invention, but also affords additional advantages of reduced costs of assembly, eliminates the need of extruded tubular sections, and increases the quantity of poison material provided between neighboring stored fuel. In addition, the invention provides means for connecting adjacent fuel rack assemblies together in a manner which increases the overall rigidity of installation while permitting thermal expansion and contraction of adjacent rack assemblies.

In accordance with a feature of the present invention, a tubular enclosure structural wall construction comprising at the location of the stored fuel a continuous layer of poison material completely surrounding the fuel-receiving slot is used.

Additional important features of the invention are the connections between adjacent rack assemblies for free standing installation, and the struts between adjacent racks and pool walls for a laterally supported installation. A unique feature of both of these systems is that they provide support against lateral seismic loads, which are suddenly-applied loads, while permitting horizontal expansion and contraction of individual rack assemblies due to temperature variation of pool water, constituting slowly-applied loads, thus minimizing thermal stresses in the rack assembly structure. Furthermore, both systems permit easy underwater installation of rack assemblies without any permanent connections to the pool walls.

In accordance with a further feature of the invention, if required to further decrease fuel activity, a poison filled tube can be provided in the fuel-receiving slots formed between the corner-connected tubular enclosures, with the result that neighboring stored fuel can be separated by two continuous layers of poison material with intervening water gaps for increased neutron absorption.

These and further features and advantages of the present invention will be best understood from the detailed description that follows of preferred embodiments in accordance with the present invention, taken in conjunction with the accompanying drawings wherein.

Figure 1:
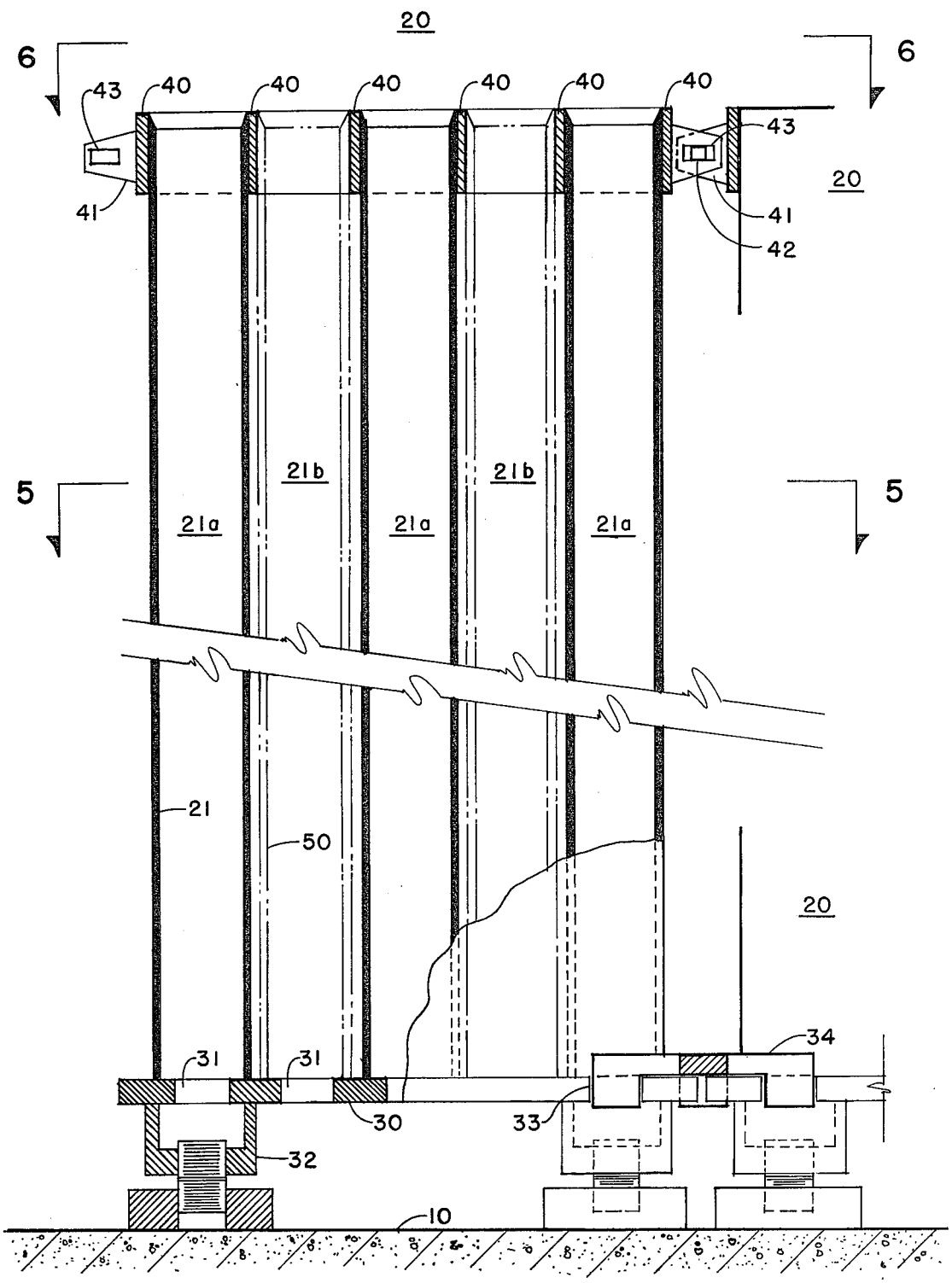
FIG. 1 is an elevational cross-sectional view of a preferred form of storage rack assembly in accordance with the present invention shown mounted in a storage pool.
Figure 7:
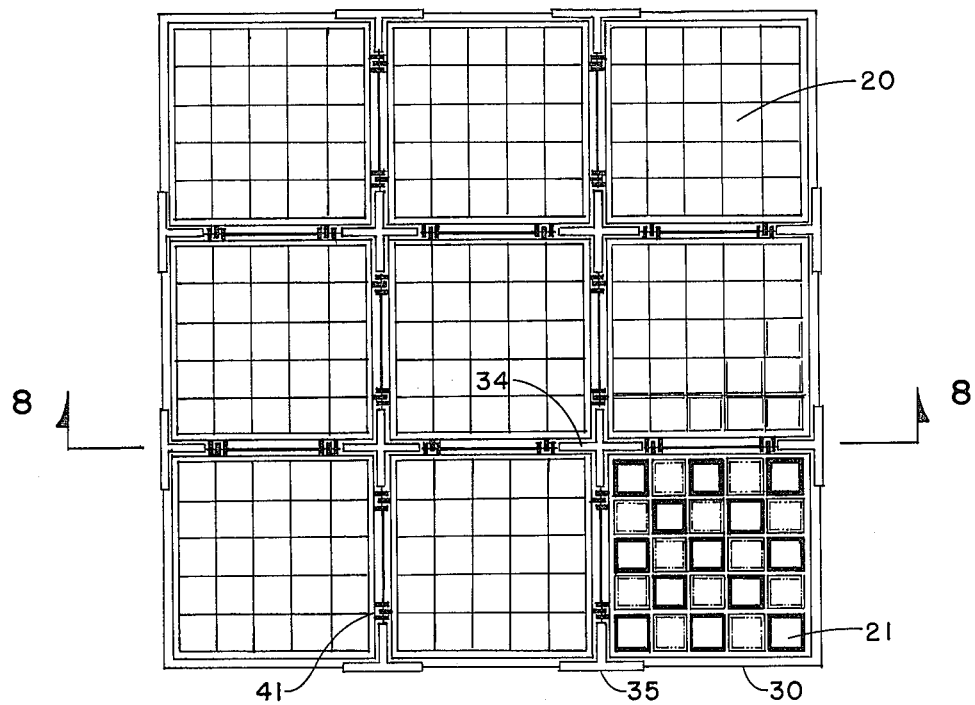
FIG. 7 is a plan view showing a typical arrangement of free standing, interconnected rack assemblies installed in a spent fuel pool.

The rack assembly of the present invention is designated generally as 20 in the elevational view of FIG. 1. In actual practice, each rack assembly may provide several hundred fuel-receiving slots. For simplicity, the invention will be described in connection with a rack providing twenty-five slots, formed by thirteen tubular enclosures designated 21. In FIG. 1, the bottom of the storage pool is designated 10. The rack assembly is secured as by bolting or welding to a perforated base plate 30, the perforations 31 allowing circulation of the pool water throughout the rack. The rack of course is immersed in the pool well below the pool surface. The base plate 30 can in turn be mounted directly on the pool floor 10, or suitable adjustable height support means 32 provided, as illustrated, for levelling the rack. As in the copending application, a top stiffening frame 40 is added to enhance the strength and rigidity of the rack. The rack assemblies 20 are interconnected near their tops to adjacent rack assemblies through attachments 41 connected to the frame 40, for a free standing type of installation as shown in FIG. 7. The attachment 41 is designed to prevent vertical relative movement between adjacent rack assemblies 20, while permitting a limited amount of horizontal movement. This is achieved by a tight fit of a pin 42 against the top and bottom surfaces of horizontally slotted holes 43 in attachment 41, with pin 42 providing clearance to the side surfaces of slotted holes 43 permitting relative horizontal movement of attachments 41 mounted to adjacent racks. Other arrangements using similar principles can be used for this connection.

The rack assemblies 20 are interconnected at their bottom by keying slots 33 at the edges of base plates 30 to adjacent base plates 30 through means of cross shaped keyed ties 34 at interior locations or by means of tee shaped ties 35 at exterior locations (see also FIG. 7). The keyed ties 34 and 35 maintain the proper relative position of rack assemblies 20 for the installation and prevent excessive movement of rack assemblies 20 with respect to each other in the event of a seismic event. Limited lateral movement is provided by gaps between slots 33 and keyed ties 34 or 35.

Figure 2:
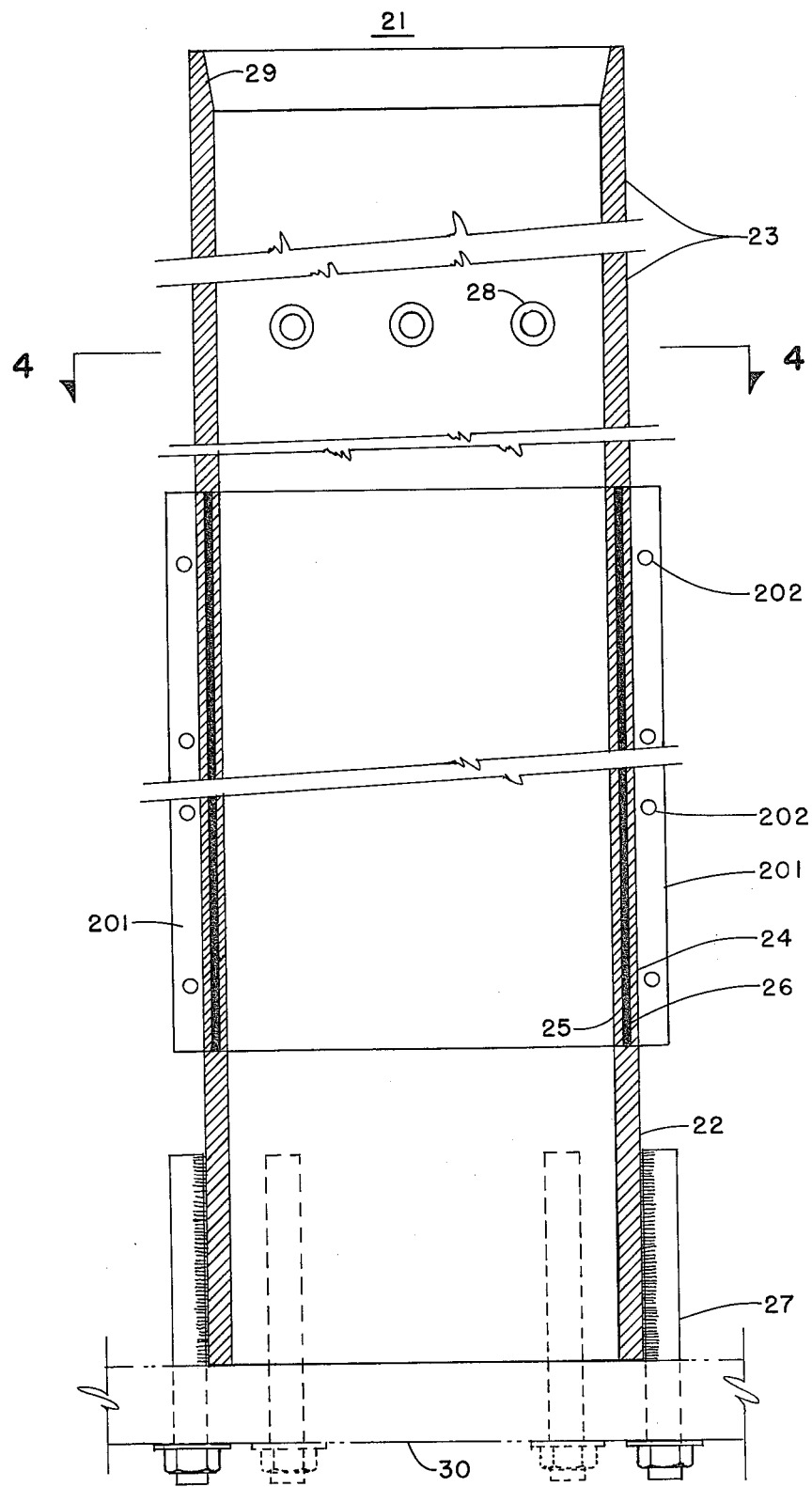
FIG. 2 is a cross-sectional view of one of the tubular enclosures used in the rack assembly of FIG. 1.
Figure 4:
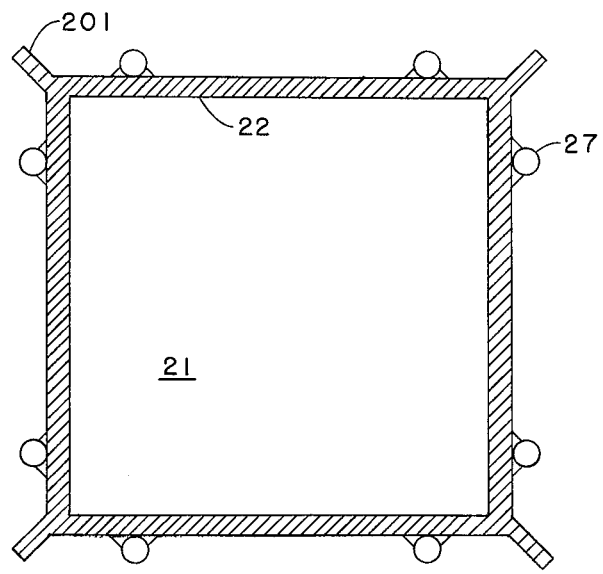
FIG. 4 is a cross-sectional view along the line 4—4 of FIG. 2.

FIGS. 2 and 4 are enlarged elevational and cross-sectional views of the tubular enclosure 21. As shown, it comprises a generally rectangular, in this instance square, elongated tube whose four walls each comprise lower 22 and upper 23 structural metal sections and a central section consisting of an outside structural metal tube 24 and inside metal tube 25 enclosing poison material 26 which can be "Boral 38", a boron and aluminum sheet poison. Other poison materials can be substituted. The tubes 24 and 25 are welded to top and bottom sections 23 and 22 so as to seal poison material 26 from entry of pool water. The bottom section 22 is provided with threaded studs 27 for mounting tubular enclosure 21 onto the base plate 30. The upper section 23 can be provided with countersunk holes 28 for securing each enclosure 21 to the top stiffening frame 40, and with a tapered tip 29 to facilitate entry of the fuel. The structural metal tube 24 is provided with flanges 201 at its corners by means of which it is connected to neighboring enclosures. The outside tube 24 of tubular enclosure 21 when connected to adjacent outside tubes 24 of adjacent tubular enclosures 21 through flanges 201 form rigid shearwalls (diaphragms) extending in two directions across the rack assembly 20 (see also FIG. 5), thus providing a very rigid structure with high natural frequency as required to minimize seismic forces. The inside tube 25 is essentially used for sealing the poison 26 from pool water. Since the inside tube 25 is welded to top section 23 and bottom section 22 it contributes additional stiffness to rack assembly 20.

In a typical facility, with a reactor employing fuel assemblies approximately ten feet tall, each enclosure 21 would have a height of about 14 feet, with the bottom section 22 about 4 inches high, and the upper section 23 about 1 and one-half feet high. The enclosure cross-section would be about 6 inches square for Boiling Water Reactor fuel, and about 10 inches square for Pressurized Water Reactor fuel assemblies. The total wall thickness of tubular enclosure would be, typically, ¼ to 5/16 inches thick.

Figure 3:
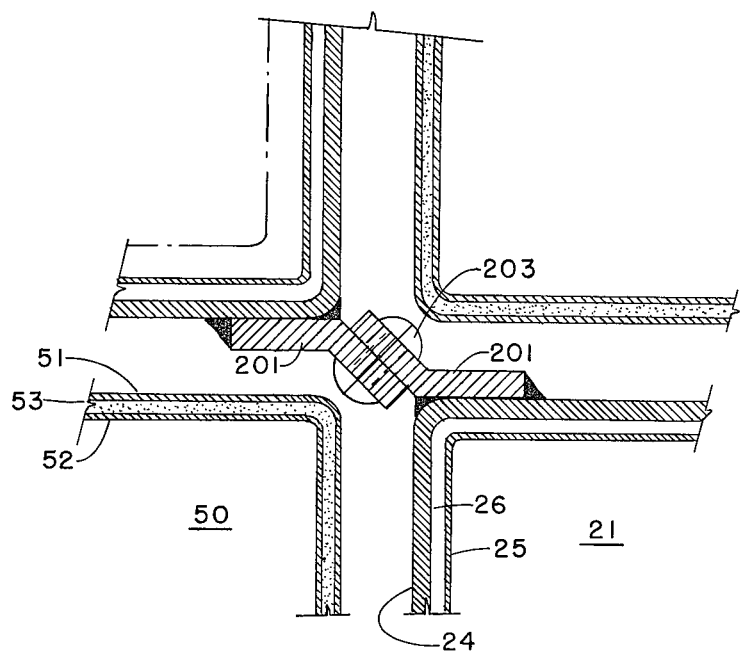
FIG. 3 is a detail view showing the corner interconnections of neighboring tubular enclosures in the rack of FIG. 1.
Figure 5:
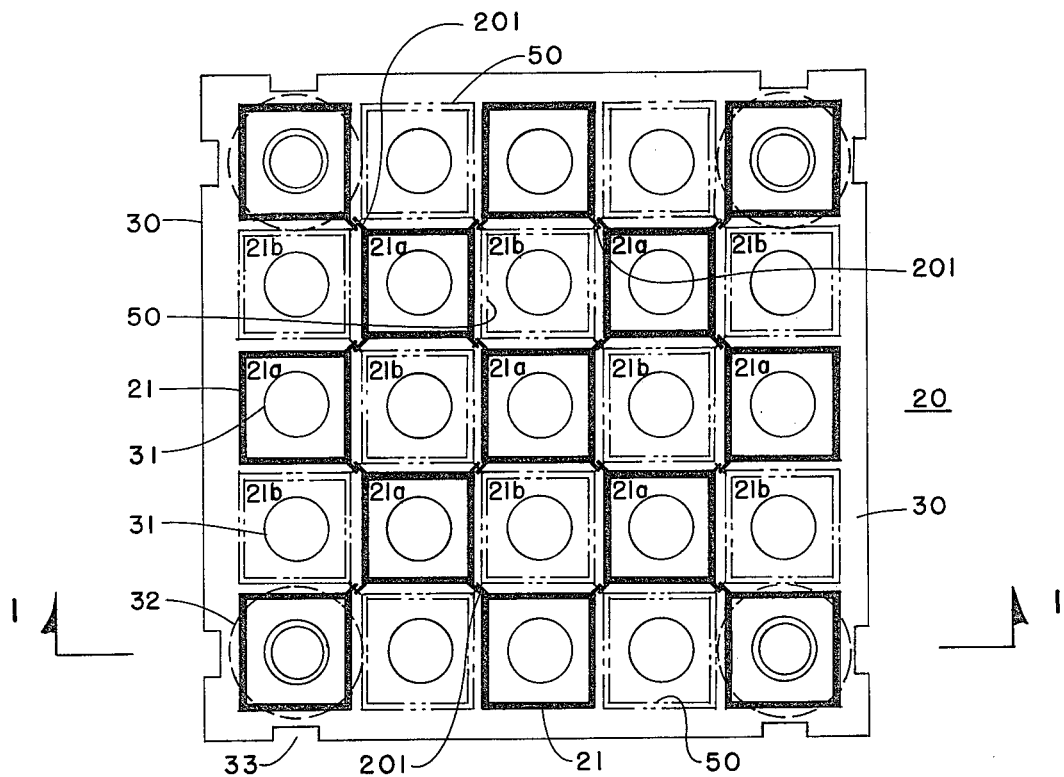
FIG. 5 is a schematic cross-sectional view along the line 5—5 of FIG. 1.
Figure 6:
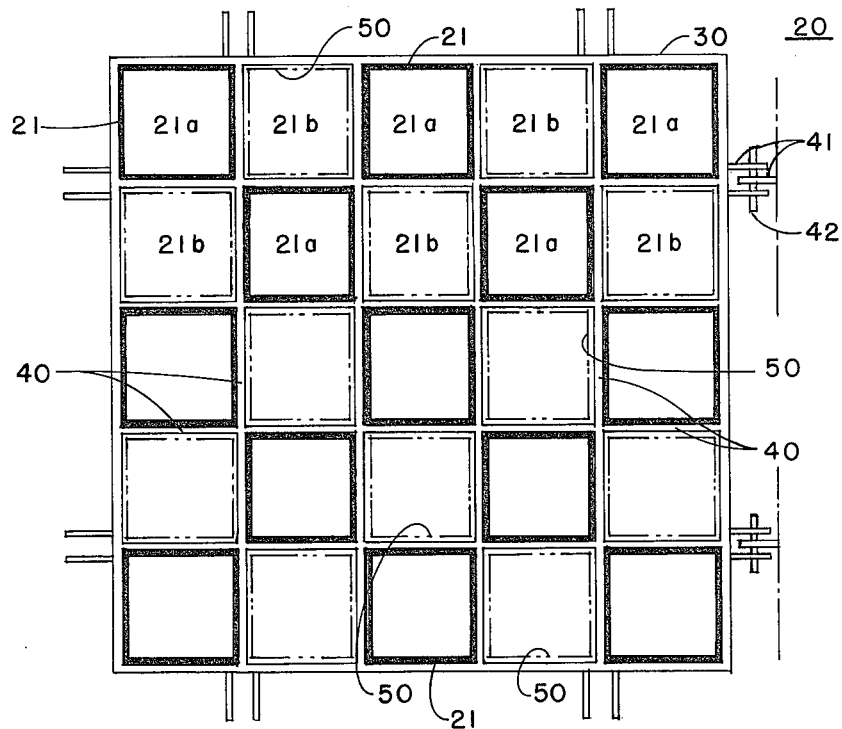
FIG. 6 is a top plan view of the rack assembly of FIG. 1.

FIG. 5 illustrates how the tubular enclosures 21 are arranged in a checkerboard array. The tubular enclosures, shown in darker lines, are structural tubes and are arranged in five rows with three in the odd rows and two in the even rows forming slots 21a within the tubular enclosures and slots 21b between adjacent tubular enclosures as in the prior copending application. As will be observed, each of the enclosures 21 where it adjoins a neighboring enclosure 21 is provided with the corner flanges 201. The flanges 201 can be part of the enclosure wall. FIG. 3 is a detail view showing another suitable construction where flanges 201 are added to the enclosures. The corner flanges 201 can be welded as shown to the enclosures. Fastening means are provided to rigidly join together the corner flanges 201 of neighboring enclosures. In FIG. 3 rivets 203 are shown. Bolts or weldments can also be used. The fastening means are distributed along the length of the corner flanges. In FIG. 2, holes 202 are shown in the flanges to receive the rivets 203. The rivets 203 can be spaced so as to provide a strong rigid interconnection between adjacent tubes 24. The combination of structural enclosure walls rigidly joined substantially throughout their entire length to neighboring enclosure walls forms a strong rigid honeycomb structure having in both the vertical and horizontal directions of FIG. 5 four shear walls within the rack. The shear walls are capable without buckling or bending of resisting substantial vertical and transverse loads, which is especially important in nuclear power facilities which must be capable of resisting seismic loads. Additional strength and rigidity is imparted by the top stiffening frame 40, which is a structural grid member whose grid walls surround and are secured as by rivets or by welding to each tubular enclosure upper section 23 as shown in FIGS. 6 and 1.

The rack assembly, as so far described, can be used to store twenty-five fuel assemblies, approximately twice the number of structural tubular enclosures present, each of which is separated from its neighbor by a single poison barrier 26. The structure also lends itself to increasing the neutron absorption by providing, if desired, additional poison barriers. This is readily accomplished by providing separate poison tubes 50 similar to construction of tubular enclosures 21 and simply placing such a tube in each of the slots 21b formed between the interconnected tubular enclosures 21. Such optional poison tubes are shown in phantom at 50 in FIGS. 1, 5, and 6, and in solid in FIG. 3. The additional poison tubes 50, as shown in FIG. 1, can rest on the base plate 30. With the poison tubes 50 in place, neighboring fuel will be separated by spaced poison barriers with intervening gaps filled with the pool water to provide increased neutron absorption. While poison tubes 50 are similar in construction to tubular enclosures 21, they are not used, in general, to increase the structural stiffness of rack assembly 20 and thus flanges 201 used for tubular enclosures 21 are not required. Also tubes 51 and 52 sealing poison 53 (FIG. 3) can be made of thinner materials than the tube 24 for tubular enclosure 21.

Figure 8:
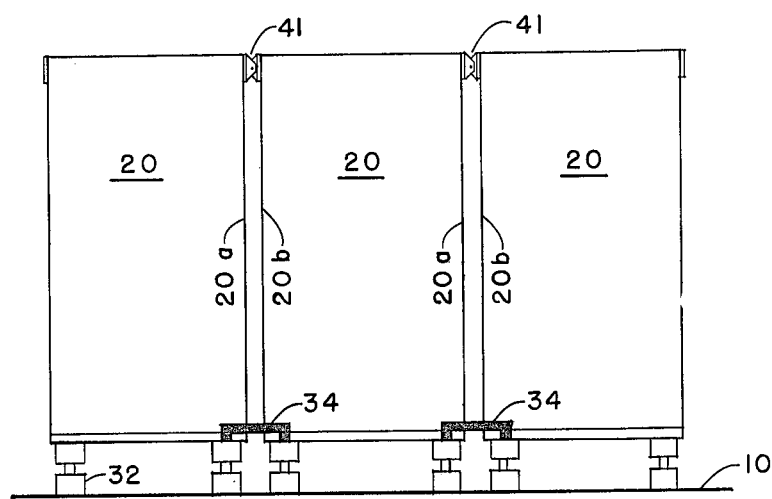
FIG. 8 is a cross-sectional view along line 8—8 of FIG. 7 showing top and bottom connections for free standing rack assemblies.

FIGS. 7 and 8 show a typical free standing installation of spent fuel rack assemblies 20 in the spent fuel storage pool. Each fuel rack assembly 20 is supported on pool floor 10 by adjustable height support means 32. Fuel rack assemblies 20 are properly located with respect to each other and tied together through base plates 30 by keyed ties 34 and 35. Fuel rack assemblies 20 are leveled by supports 32 and top connections made through attachments 41. Since attachments 41 prevent relative vertical movement of sides 20a and 20b of adjacent rack assemblies 20, (see also FIGS. 1 and 5) these rack assemblies cannot tilt individually and thus increased lateral stability of the free standing installation is achieved. Since attachments 41 and ties 34, 35 permit limited relative horizontal expansion and contraction of rack assemblies 20 (see FIG. 1) thermal stresses of the installation are minimized.

Figure 9:
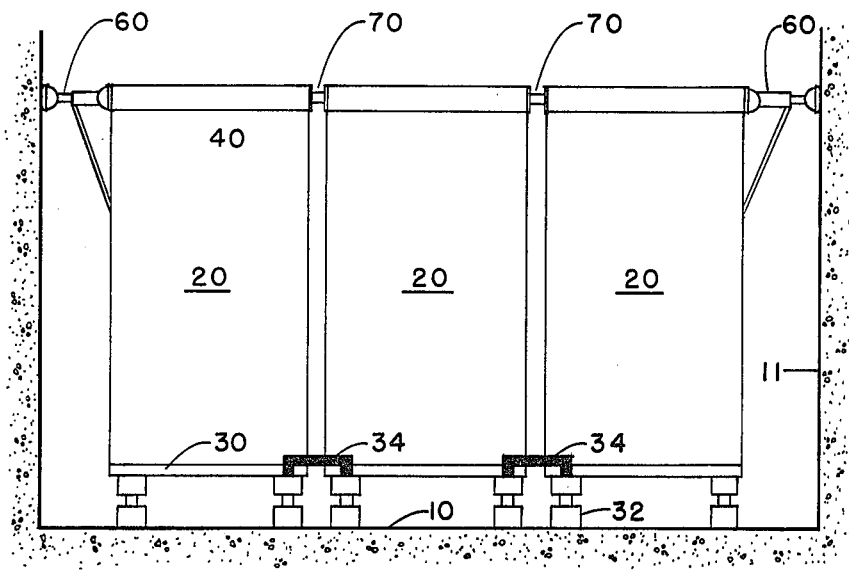
FIG. 9 is a cross-sectional view, similar to FIG. 8, except showing an installation which is laterally supported by pool walls.

FIG. 9 is a typical cross sectional view of a rack installation into a spent fuel pool utilizing lateral supports to pool walls for additional rigidity. Bottoms of rack assemblies 20 are supported, tied together and leveled identical to free standing racks as shown in FIGS. 7 and 8. At the top, instead of attachments 41 as shown in FIGS. 7 and 8, compression cylinders 70 are used. At the sides, water filled struts 60 are used to support the rack installation against the pool walls.

Figure 10:
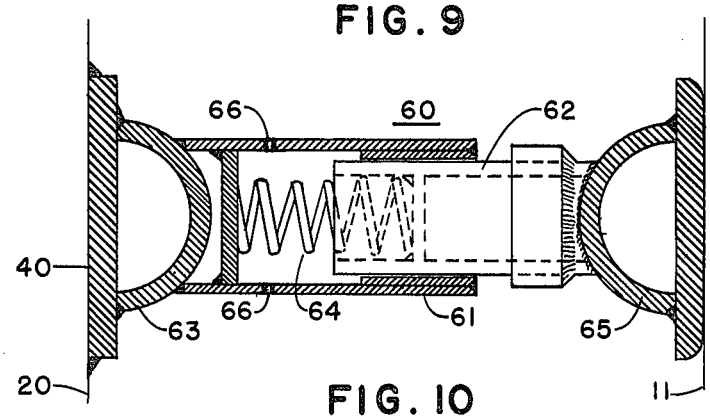
FIG. 10 illustrates a typical lateral support between a rack assembly and pool wall for a laterally supported installation.

Water filled struts 60 (see FIG. 10) consist of an outside cylinder 61 and piston 62. The struts are connected to rack assembly 20 top stiffening frame 40 through a load distributing member 63. The piston 62 is pressed against the pool wall 11 through load distributing member 65 by spring 64 placed inside the cylinder 61. Load distributing member 65 is not fastened to pool wall 11. A minimum of two water filled struts 60 are used for each rack assembly 20 facing pool wall 11 tied together by load distributing members 63 and 65. Pool water fills the cylinder through small orifices 66 which may be furnished with protective means (not shown) to prevent entry of dirt particles.

If the relative movements of cylinder 61 and piston 62 are slow, such as movements due to temperature changes, water can escape and reenter through the orifices 66 and the strut 60 does not offer resistence to slow thermal movements; thereby the thermal stresses in the rack installation are minimized. If the relative movements of cylinder 61 and piston 62 are fast, such as during a seismic event, escape of water is restricted by the small size of orifices 66 and thus the water inside cylinder 61 provides a rigid support against seismic forces and movement. Since pool water is used as the load supporting fluid and since the strut 60 is always submerged into pool water, no accidental loss of load supporting fluid can occur.

Figure 11:
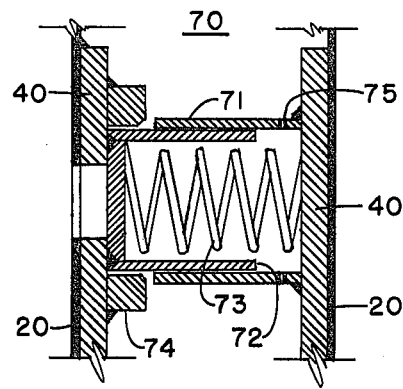
FIG. 11 illustrates a typical lateral support between adjacent rack assemblies for a laterally supported installation.

Compression cylinders 70 (see FIG. 11) are used in between adjacent rack assemblies 20. Each compression cylinder 70 consists of a cylinder 71 connected to the rack assembly top stiffening frame 40 and a piston 72 pressed against the adjacent rack top stiffening frame 40 by spring 73. The piston 72 further engages a socket 74 fastened to adjacent rack assembly stiffening frame 40. Pool water enters the cylinder 71 through orifices 75. The operation of compression cylinder 70 is similar to strut 60.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A nuclear fuel storage rack comprising a plurality of elongated, corner-adjoining, parallel enclosures each of generally rectangular cross-section and structural means distributed along portions of their length and permanently joining each of the enclosures to their neighboring enclosures at their corners in a checkerboard array to form a rigid honeycomb structure having transverse shear walls extending across the rack and wherein the number of fuel-receiving slots present is approximately equal to twice the number of enclosures present, each fuel enclosure having structural wall portions comprising poison material forming a continuous tube surrounding the fuel-receiving slot therein, top stiffening means secured to the top of the honeycomb structure at each enclosure, means for mounting said honeycomb structure within a fuel storage pool, and a plurality of elongated tubes constituted of poison material, one of said poison tubes being located within each of the fuel-receiving slots located between the interconnected enclosures.

2. A nuclear fuel storage rack comprising a plurality of elongated, corner-adjoining, parallel enclosures each of generally rectangular cross-section and structural means distributed along portions of their length and permanently joining each of the enclosures to their neighboring enclosures at their corners in a checkerboard array to form a rigid honeycomb structure having transverse shear walls extending across the rack and wherein the number of fuel-receiving slots present is approximately equal to twice the number of enclosures present, each fuel enclosure having structural wall portions comprising poison material forming a continuous tube surrounding the fuel-receiving slot therein, top stiffening means secured to the top of the honeycomb structure at each enclosure, and means for mounting said honeycomb structure within a fuel storage pool, the enclosures having at their corners longitudinally-extending flanges, the corner joining means rigidly joining together the enclosures at their corner flanges.

3. A nuclear fuel storage rack comprising a plurality of elongated, corner-adjoining, parallel enclosures each of generally rectangular cross-section and structural means distributed along portions of their length and permanently joining each of the enclosures to their neighboring enclosures at their corners in a checkerboard array to form a rigid honeycomb structure having transverse shear walls extending across the rack and wherein the number of fuel-receiving slots present is approximately equal to twice the number of enclosures present, each fuel enclosure having structural wall portions comprising poison material forming a continuous tube surrounding the fuel-receiving slot therein, top stiffening means secured to the top of the honeycomb structure at each enclosure, and means for mounting said honeycomb structure within a fuel storage pool, each enclosure comprising upper, central, and lower wall sections, the poisoning material being located only in the central wall section.

4. Nuclear fuel storage rack as claimed in claim 3 wherein the central wall section comprises inner and outer metal parts sandwiching therebetween a layer of poisoning sheet material.

5. A nuclear fuel storage rack installation comprising a plurality of interconnected adjacent rack assemblies each comprising a plurality of elongated, corner-adjoining, parallel enclosures joined to their neighboring enclosures at their corners in a checkerboard array to form a rigid honeycomb structure having transverse shear walls extending across the rack, means for mounting said rack assemblies within a fuel storage pool, said installation providing support against overturning caused by lateral seismic loads while permitting horizontal expansion and contraction of individual rack assemblies in response to pool temperature variations, and the rack assembly interconnections comprising means for preventing relative vertical movement but allowing limited relative horizontal movement between adjacent rack assemblies.

6. Nuclear fuel storage rack installation as claimed in claim 5 wherein the rack assembly interconnections comprise attachments with slots interconnected by pins engaging the slots with no vertical clearance and limited horizontal clearance.

7. Nuclear fuel storage rack installation as claimed in claim 5 wherein the rack assembly interconnections comprises ties keyed into slots in the racks which allow limited horizontal movement.

8. Nuclear fuel storage rack installation as claimed in claim 5 wherein the rack assembly interconnections comprise a hydraulic cylinder and cooperating biased piston coupled to adjacent rack assemblies.

9. Nuclear fuel storage rack installation as claimed in claim 5 wherein the rack assembly interconnections permit vertical removal of any rack assembly within the installation without moving adjacent rack assemblies.

10. A nuclear fuel storage rack installation comprising a plurality of interconnected adjacent rack assemblies each comprising a plurality of elongated, corner-adjoining, parallel enclosures joined to their neighboring enclosures at their corners in a checkerboard array to form a rigid honeycomb structure having transverse shear walls extending across the rack, and means for mounting said rack assemblies within a fuel storage pool, said pool mounting means providing support against lateral seismic loads while permitting horizontal expansion and contraction of individual rack assemblies in response to pool temperature variations and comprising a hydraulic cylinder and piston mounted between the pool wall and the adjacent rack assembly.

11. Nuclear fuel storage rack installation as claimed in claim 10 wherein the hydraulic cylinder and piston are connected to the rack but not to the pool wall, and load distributing members are provided between the rack and the hydraulic cylinder and piston, and between the pool wall and the hydraulic cylinder and piston.

12. Nuclear fuel storage rack installation as claimed in claim 10 wherein the hydraulic cylinder and piston have fluid passing orifices.

13. Nuclear fuel storage rack installation as claimed in claim 10 wherein the rack assembly interconnections comprise a hydraulic cylinder with fluid passing orifices to the storage pool and cooperating biased piston coupled to adjacent rack assemblies whereby the working fluid of the cylinder and piston is the pool water.

14. A nuclear fuel storage rack comprising a plurality of elongated, corner-adjoining, parallel enclosures each of generally rectangular cross-section and structural means distributed along portions of their length and permanently joining each of the enclosures to their neighboring enclosures at their corners in a checkerboard array to form a rigid honeycomb structure having transverse shear walls extending across the rack and wherein the number of fuel-receiving slots present is approximately equal to twice the number of enclosures present, each fuel enclosure having structural wall portions comprising poison material forming a continuous tube surrounding the fuel-receiving slot therein, and the corner-adjoining means rigidly joining the enclosures at said structural wall portions.

15. Nuclear fuel storage rack as claimed in claim 14 wherein each enclosure comprises a water-sealed double-walled construction with the outer wall constituting a structural wall portion.

16. Nuclear fuel storage rack as claimed in claim 15 wherein the poison material is located inside the double-walled construction.

17. Nuclear fuel storage rack as claimed in claim 14 wherein each enclosure comprises upper, central, and lower wall sections, the poisoning material being located only in the central wall section.

18. Nuclear fuel storage rack as claimed in claim 14 wherein each wall enclosure has an upper wall section free of poison, and further comprising means for interconnecting the upper wall sections of adjacent enclosures.

19. Nuclear fuel storage rack as claimed in claim 14 wherein additional tubular enclosures comprising poison are placed into spaces in between the tubular enclosures which form the shear walls, said additional tubular enclosures providing additional poison and water gap between the structural tubular enclosures and additional tubular enclosures for increased neutron absorption.

20. In a nuclear fuel storage rack installation comprising a plurality of interconnected adjacent rack assemblies each comprising a plurality of elongated, corner-adjoining, parallel enclosures joined to their neighboring enclosures at their corners in a checkerboard array to form a rigid honeycomb structure having transverse shear walls extending across the rack and means for mounting said rack assemblies within a fuel storage pool, the improvement comprising said installation comprising means providing a substantially rigid support against suddenly-applied loads while permitting movement of individual rack assemblies in response to temperature changes.

21. Nuclear fuel storage rack installation as claimed in claim 20 wherein said last-named means comprise a hydraulic cylinder and piston with fluid passing orifices to the storage pool fluid whereby the working fluid of the hydraulic cylinder and piston is the pool fluid.

* * * * *